United States Patent [19]
Frazier et al.

[11] Patent Number: 5,544,333
[45] Date of Patent: Aug. 6, 1996

[54] SYSTEM FOR ASSIGNING AND IDENTIFYING DEVICES ON BUS WITHIN PREDETERMINED PERIOD OF TIME WITHOUT REQUIRING HOST TO DO THE ASSIGNMENT

[75] Inventors: Giles R. Frazier; Gary Y. Tsao, both of Austin, Tex.

[73] Assignee: International Business Machinces Corp., Armonk, N.Y.

[21] Appl. No.: 380,473

[22] Filed: Jan. 30, 1995

Related U.S. Application Data

[63] Continuation of Ser. No. 61,786, May 14, 1993, abandoned.
[51] Int. Cl.⁶ .................................................. G06F 13/38
[52] U.S. Cl. ........................................ 395/304; 364/240
[58] Field of Search .................................... 395/304

[56] References Cited

U.S. PATENT DOCUMENTS

| | | | |
|---|---|---|---|
| 4,360,870 | 11/1982 | McVeg ..................................... | 395/275 |
| 4,661,902 | 9/1987 | Huchsprung et al. .................. | 395/800 |
| 4,680,753 | 7/1987 | Fulten et al. ........................... | 370/85.8 |
| 4,689,786 | 8/1987 | Sidhu et al. ............................ | 370/94 |
| 4,730,251 | 3/1988 | Aakre et al. ............................ | 395/325 |
| 4,750,136 | 6/1988 | Arpin et al. ............................ | 364/514 |
| 4,760,597 | 6/1988 | Hayes et al. .. | |
| 4,817,091 | 3/1989 | Katzman et al. ....................... | 371/9.1 |
| 4,884,266 | 11/1989 | Pflaumer ................................. | 370/84 |
| 4,897,837 | 7/1989 | Morales et al. ......................... | 371/8.2 |
| 4,899,274 | 2/1990 | Hansen et al. .. | |
| 4,964,038 | 10/1990 | Louis et al. .. | |
| 4,975,830 | 12/1990 | Gerpheide et al. ..................... | 395/800 |
| 5,023,871 | 6/1991 | Nakayashiki et al. ................. | 370/85.5 |
| 5,038,320 | 8/1991 | Heath et al. ............................. | 395/275 |
| 5,297,622 | 9/1993 | Choi ........................................ | 395/325 |

OTHER PUBLICATIONS

Steffora et al. "Supplies Join Forces to Simplify Expansion Card Installation" PC User, Mar. 24, 1993.
IBM TDB, "SCSI Self–Selection", vol. 33, No. 10A, Mar. 1991, pp. 57–59.

*Primary Examiner*—Krisna Lim
*Attorney, Agent, or Firm*—Paul S. Drake

[57] ABSTRACT

In a computer system having multiple devices on a bus, a method for a first device on the bus to designate its own identifier including the steps of the first device transmitting on the bus a request for a device with a desired identifier to respond, determining that no device on the bus responds to the request, and upon such determination, designating the desired identifier to identify the first device to at least one of the multiple devices on the bus. In addition, in a computer system having multiple devices on a bus, a first device including apparatus for transmitting on the bus a request for a device with a desired identifier to respond, apparatus for determining that no device on the bus responds to the request, and apparatus for, upon such determination, designating the desired identifier to identify at least one of the first device to the multiple devices on the bus.

18 Claims, 4 Drawing Sheets

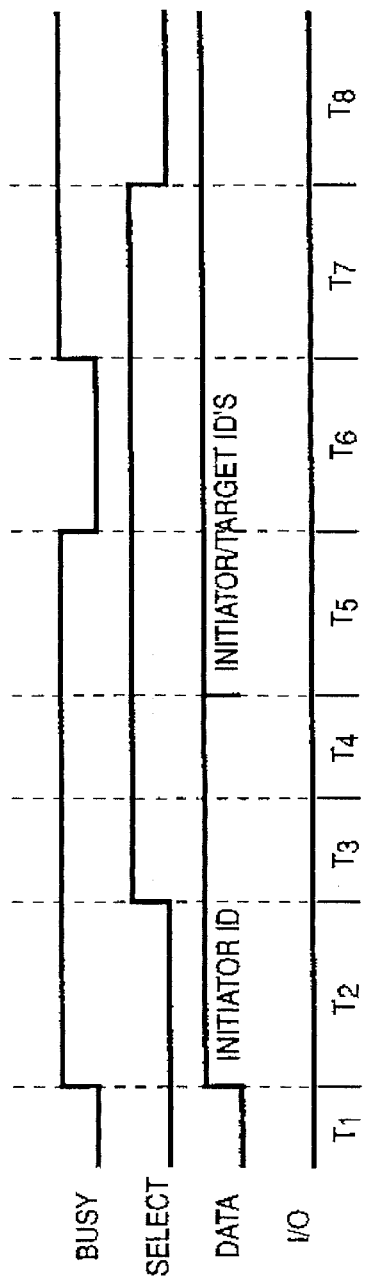

5,544,333

SYSTEM FOR ASSIGNING AND IDENTIFYING DEVICES ON BUS WITHIN PREDETERMINED PERIOD OF TIME WITHOUT REQUIRING HOST TO DO THE ASSIGNMENT

This is a continuation of application Ser. No. 08/061,786 filed May 14, 1993 now abandoned.

TECHNICAL FIELD

The present invention relates to identifying devices on a bus and more particularly to a device obtaining its own identification number on the bus.

BACKGROUND ART

In computer systems, bus attached devices such as tapes, disk drives and other input/output devices including hosts typically require identification numbers to be identified for receiving communications.

These identification numbers may be predetermined by the use of jumper wires on each device that a user manipulates. However, the process of manipulating these jumper wires may be time consuming and error prone, particularly if the device is located within the cabinet of a computer. Other techniques include using unique identification numbers that are hard-wired into each device such as in U.S. Pat. No. 5,038,320. However, such unique identification numbers must be long due to the large number of possible devices available for buses. As a result, communications may be slowed by including such a long identification number in each communications package across a bus.

SUMMARY OF THE INVENTION

The present invention includes in a computer system having multiple devices on a bus, a method for a first device on the bus to designate its own identifier including the steps of the first device transmitting on the bus a request for a device with a desired identifier to respond, determining that no device on the bus responds to the request, and upon such determination, designating the desired identifier to identify the first device to at least one of the multiple devices on the bus. In addition, the present invention includes in a computer system having multiple devices on a bus, a first device including apparatus for transmitting on the bus a request for a device with a desired identifier to respond, apparatus for determining that no device on the bus responds to the request, and apparatus for, upon such determination, designating the desired identifier to identify at least one of the first device to the multiple devices on the bus.

BRIEF DESCRIPTION OF THE DRAWING

FIG. 4 is a timing diagram illustrating a device attempting to determine according to a preferred embodiment of the invention whether any device on the bus has a desired identification number; and FIG. 5 illustrates how several devices may seek an identification number concurrently.

BEST MODE FOR CARRYING OUT THE INVENTION

Figure 1:
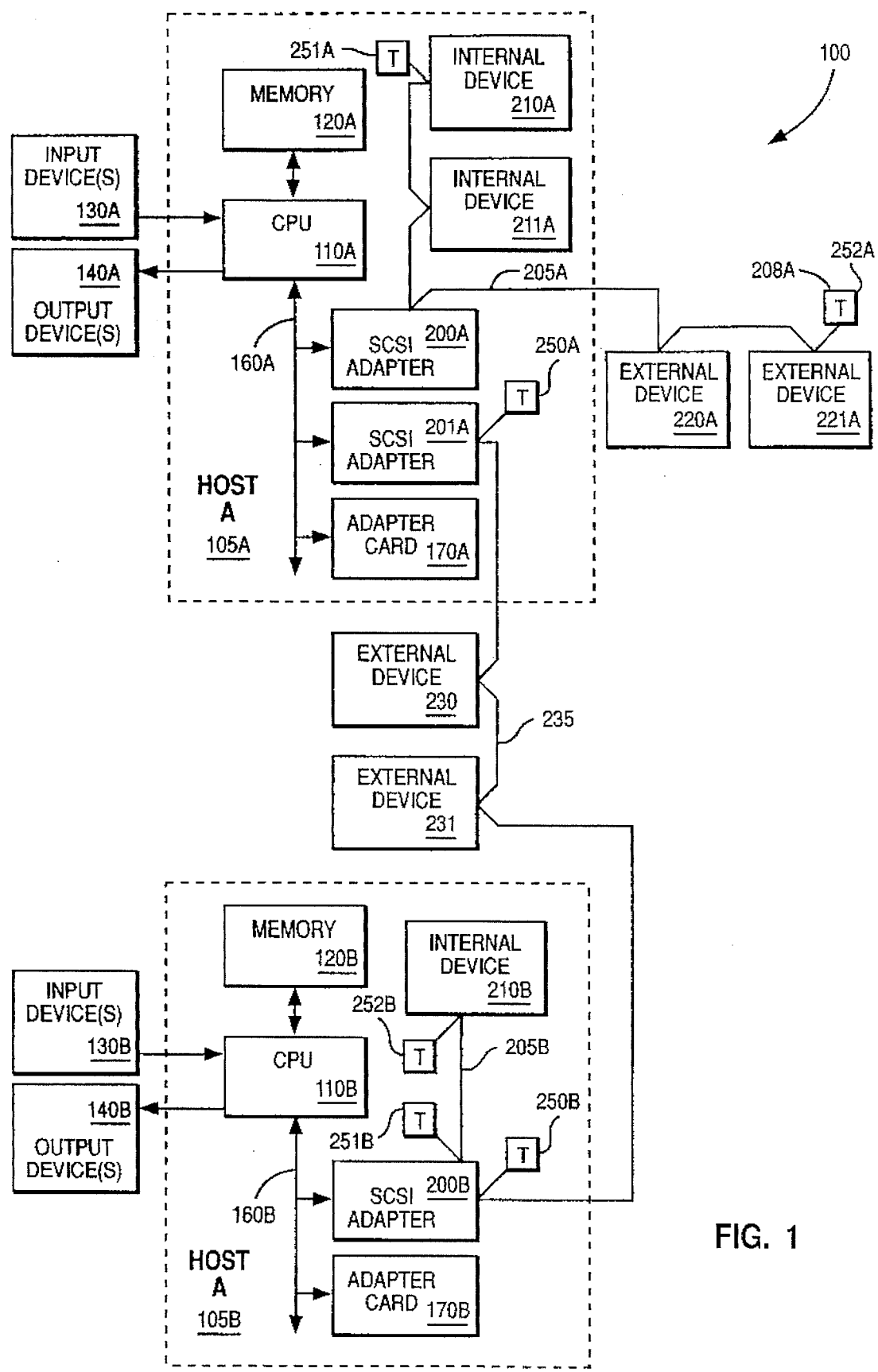
FIG. 1 is a block diagram of a typical multi-host computer system utilized by a preferred embodiment of the invention.

FIG. 1 is a block diagram of a typical multi-host computer system 100 utilized by a preferred embodiment of the invention. The present invention may also be utilized by a single host system. The computer system includes host A 105A and host B 105B. Each host includes a CPU (central processing unit) 110A and 110B coupled to memory 120A and 120B, input device(s) 130A and 130B, and output device(s) 140A and 140B. CPU's 110A and 110B may each include a single processor or multiple processors. Input device(s) 130A and 130B may include a keyboard, a mouse, a tablet, or other type of input devices. Output device(s) 140A and 140B may include a display, plotter or other type of output devices.

The CPU's 110A and 110B may be coupled to various adapters on a system buses 160A and 160B. As illustrated, adapter cards 170A and 170B may be coupled to the CPU's system buses 160A and 160B. These adapter cards may be communication devices such as a fax/modem, Ethernet or token ring adapters, video or graphics adapters, disk drives or floppy Control units, or other adapter cards known to those of ordinary skill in the art. In addition, SCSI adapters 200A, 201A, and 200B may be coupled to the system buses for providing communication between the CPUs and various internal devices 210A, 211A and 210B and various external devices 220A, 221A, 230 and 231 across SCSI buses 205A, 205B and 235. The SCSI adapters also provide communications between host A and host B such as across SCSI bus 235 and also allows the two hosts to share common devices such as external devices 230 and 231. Some SCSI adapters may handle multiple SCSI buses such as SCSI adapter 200B with SCSI buses 205B and 235. In addition, each bus is terminated on each end with terminators 250A, 251A, 252A, 250B, 251B and 252B.

Additional devices may be added to the SCSI buses at any location when the buses are down such as when the host systems and the devices on the bus are turned off. In addition, devices may be added to the bus at each end of a bus while the bus is functioning. Furthermore, devices already on the bus may be turned on while the bus is functioning. The present invention is primarily directed to devices turned on or added to a bus while it is functioning or to any devices already on a bus when the host systems and the devices are turned on.

Figure 2:
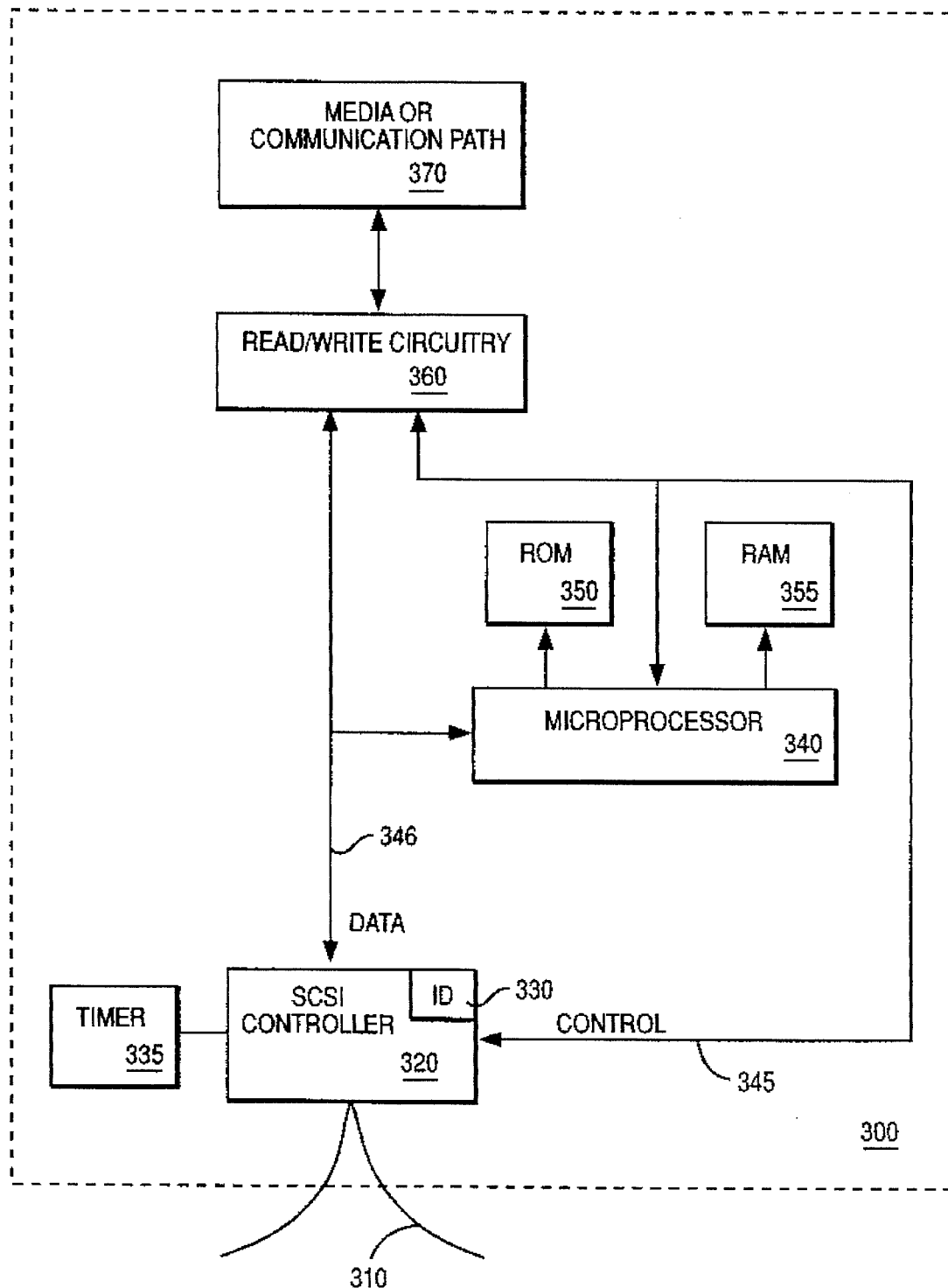
FIG. 2 is a block diagram of a SCSI device utilizing a preferred embodiment of the invention.

FIG. 2 is a block diagram of a typical SCSI device 300 utilizing a preferred embodiment of the invention. This device may be any of the SCSI bus devices described with reference to FIG. 1. Although the present invention is described with reference to a SCSI bus and SCSI devices, the present invention may also be utilized with other types of buses, including buses that are a disjoint set of communication paths, and devices, including adapters and hosts, that utilize device identification numbers or other types of identifiers (such as alphanumeric or special characters).

The SCSI device 300 is coupled to a SCSI bus 310 by SCSI controller 320. The SCSI controller is typically a hard-wired piece of circuitry for quickly handling communications across the SCSI bus. In the preferred embodiment, the SCSI controller is coupled to a timer 335 and the SCSI controller includes a register 330 which contains the SCSI identification number (ID or identifier) for the device. It is this identification number which is used by the SCSI device to determine whether it is targeted on the SCSI bus or to identify itself across the SCSI bus to other SCSI devices when it initiates any bus communications. According to SCSI specifications, without the SCSI identification number a SCSI device could not initiate or receive communications with other devices on the SCSI bus because the other devices would not be able to respond to or call the SCSI device without an identification number.

The SCSI controller is coupled to a microprocessor 340 across a microprocessor bus 345. In the preferred embodiment, the microprocessor performs many functions such as instructing the SCSI controller to determine the SCSI identification number for the SCSI device. The microprocessor is coupled to a ROM 350 and a RAM 355. The ROM 350 contains permanently stored code for operating the microprocessor and may include the below described process for obtaining an identification number. The RAM includes providing temporary storage facilities for the microprocessor to utilize during its operations. The RAM may also used to store code for operating the microprocessor including code for obtaining an identification number. However, RAM used for this purpose must either be programmed after the device is powered up or the RAM must be of the type that does not erase when the device is powered off (such as flash RAM or battery powered RAM).

Read/write circuitry 360 is coupled to microprocessor 340 and SCSI controller 320 across microprocessor bus 345. The read/write circuitry is also coupled to SCSI controller 320 across a high speed data bus 346. The read/write circuitry is typically hard wired circuitry for reading or writing data to or from the media or communication path 370. Of course, alternative embodiments may be known to those of ordinary skill in the art.

Figure 3:
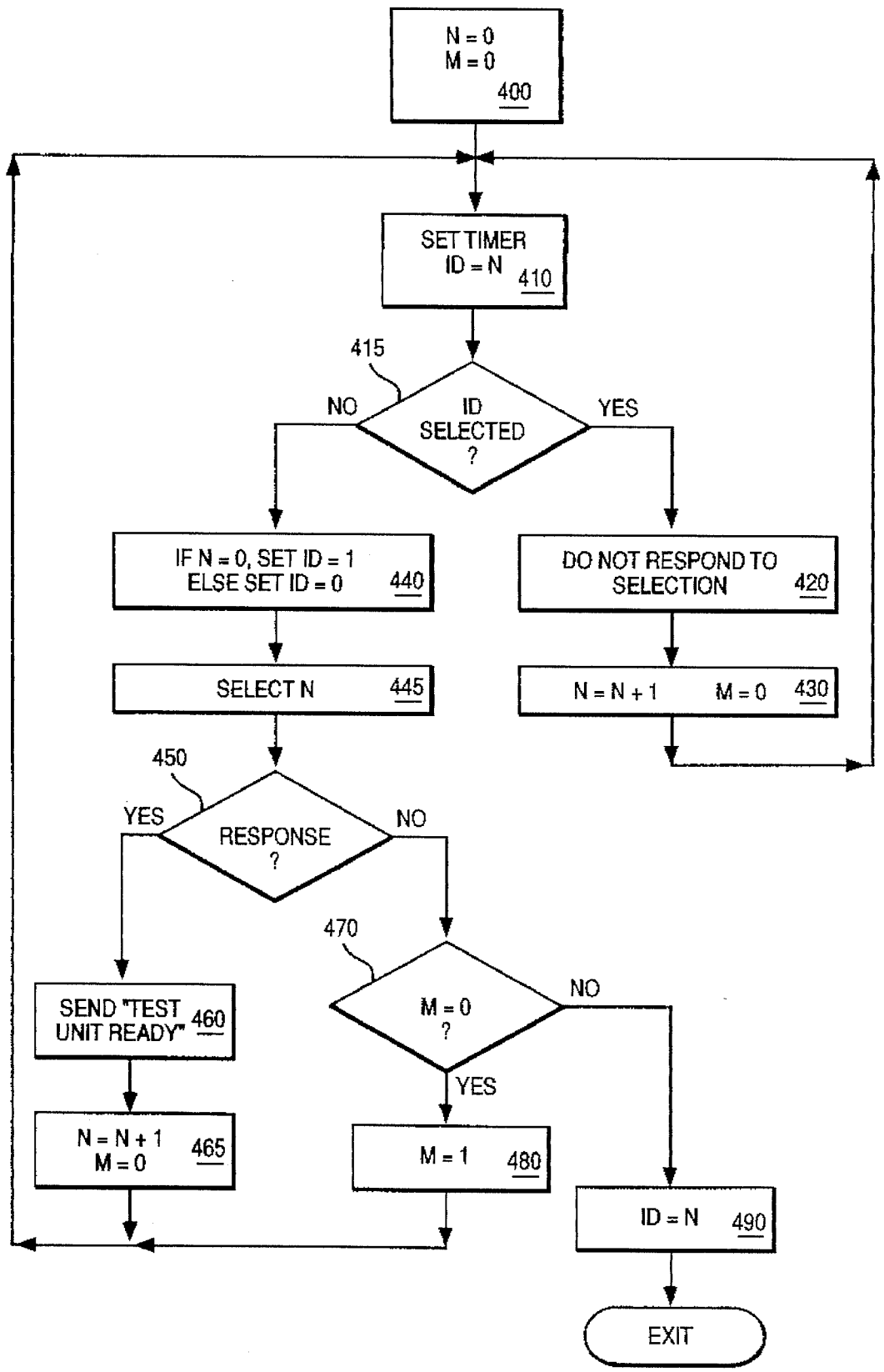
FIG. 3 is a flowchart illustrating a preferred technique for allowing the SCSI device illustrated in FIG. 2 or alternative SCSI devices to obtain an identification number or identifier on the computer system illustrated in FIG. 1 or alternative computer systems.

FIG. 3 is a flowchart illustrating a preferred technique for allowing the SCSI device illustrated in FIG. 2 or alternative devices to obtain an identification number or identifier on the computer system illustrated in FIG. 1 or alternative computer systems. In step 400, the variables N and M are preferably set to 0, typically in RAM 355 by microprocessor 340. M is a variable listing the number of times an unused identification number has been detected. N is a variable listing the identification number being tested to determine whether it is currently unused (SCSI identification numbers typically run from 0 to 8, 0 to 15 or 0 to 32 with priority set by SCSI standards). In alternative embodiments, N may also be initially set to other identification numbers such as 15. In step 410, a timer such as timer 335 is set to a random number and the current device identification number such as in register 330 is set equal to N. A random number is preferably utilized for the timer to help prevent collisions of multiple devices should more than one device be seeking an identification number at the same time such as when the host systems and the devices are turned on. In step 415, the system waits to determine whether it is called before the timer runs out. In the preferred embodiment, timer 335 of FIG. 2 is decremented only when the bus is free to avoid multiple timers expiring while the bus is busy. If the identification number is selected on the bus before the timer runs out, then another device with that identification number exists on the bus. As a result, in step 420 the system does not respond to the selection and in step 430 the variable N is incremented by 1 and M is set to 0. Processing then returns to step 410 for resetting the timer with a new random number and setting the identification number to the new value of N. If in step 415, the timer expires prior to the identifier being selected, then the device needs to further determine whether another device uses the identification number. In step 440, the identification number for the device is set equal to 1 if N=0, else the identification number is set to 0. This is to allow the device to have a different identification number from that being checked. In alternative embodiments, the device identification number may be set to any other desired number depending on the current circumstances such as mixing devices utilizing the present invention with devices not utilizing the present invention. In step 445, the device then attempts to select a device with identification number of N. This is described in more detail below with reference to FIG. 4. In step 450, the device determines whether any other devices respond to the selection with an identification number of N by determining whether the bus moves into a message or command phase. If yes, then another device already has the identification number. As a result, in step 460, the device sends a "test unit ready" command to the responding device. This is a normal instruction used in SCSI buses that minimizes any disruption caused by the selection of the responding device. In step 465, N is incremented by 1 and M is set to 0. If no device responds to the selection then no current device utilizes the identification number. However, it is possible that another device seeking an identification number has the same random time delay. As a result, the identification number selection process is repeated at least once in the preferred embodiment. Therefore, if no device responds to the selection of the identification number set to N, then in step 470 M is tested to see if this is the first consecutive successful loop. If yes, then in step 480 M is set equal to 1 and processing returns to step 410. If no, then the identification number such as in register 330 is set equal to N and processing is completed.

FIG. 4 is a timing diagram illustrating a device attempting to determine according to a preferred embodiment of the invention whether any device on the bus has a desired identification number. Illustrated are the Busy (B), Select (S), Data (D) and input/output (I/O) line signals. This timing diagram illustrates how a device determines whether a device on the bus is utilizing a desired identification number as described above with reference to step 450 of FIG. 3.

After a random time delay, as described above with reference to step 415, the device determines whether the bus is free during time span T1. The bus is considered free after the busy and select signals are not asserted for a minimum amount of time known as a bus free delay. According to SCSI standards, the bus free delay should be greater than 800 nanoseconds. In time span T2, also known as arbitration delay, the device determines whether it has priority on the bus. According to SCSI standards, the arbitration delay should last at least 2.4 microseconds. The device asserts the Busy line and places its identification number on the Data lines during this time span to determine which device asserting the busy line has the highest priority should multiple devices be seeking access to the bus. According to SCSI standards, within each byte of the identification number, the highest number has the highest priority within that byte. After the arbitration delay, the device throughout time span T3 either clears itself from arbitration (stops asserting the Busy line and its identification number on the bus) if a higher priority identification number is on the bus or the device asserts the Select line in addition to asserting the Busy line and its identification number on the Data lines if the device has the highest priority identification number.

If the device has not obtained access to the bus due to another device with higher priority, the device will attempt to gain access again after the next bus free delay. If the device has gained access to the bus, then in time span T4, the device will allow the bus to settle (for at least 400 nanoseconds according to SCSI specifications) in what is typically called bus settle delay. During this time span, all other devices on the bus compare their identification number to the identification number of the initiating device being asserted on the bus. According to the preferred embodiment, if the identification number being asserted on the bus is the same as any devices identification number, then that device shall not respond during time span T7 described below. If the identification number being asserted on the bus is not the same a devices identification number, then that device shall respond during time T7 as described below unless that device is not responding to the selection as described in step 420. However, older devices not using the present invention may respond. Therefore, devices not using the present invention should not be assigned identification numbers such as 0 or 1 that are temporarily adopted by the device testing a desired identification number. Of course, alternative arrangements may be utilized to avoid these conflicts.

In time span T5, the device enters the selection phase where it puts the target identification number on the data lines to determine whether any device on the bus utilizes that identification number. According to SCSI standards, this time span should last at least 90 nanoseconds. Then in time span T6, the device stops asserting the Busy line and waits for a device to respond. According to SCSI standards, the device should wait at least 250 milliseconds. In time span T7, a responding device will assert the busy line if it is responding to the target identification number placed on the bus. If there is a response in time span T7, then in time span T8, the device will release the Select and Data lines and will continue into a subsequent message or command phase to send a "test unit ready" command to the responding device to end communications. The device then proceeds to try another identification number according to the steps described above with reference to FIG. 3. However, if there is no response, then in time span T8, the device frees the bus. The device then proceeds to step 470 of FIG. 3 described above. While FIG. 4 was described with reference to a SCSI bus, alternative methods may be used with reference to a SCSI bus or to other types of buses.

FIG. 5 illustrates how several devices may seek an identification number concurrently. For this example, it is assumed that three devices are started at the same time on a SCSI bus that already has five devices already on the bus with identification numbers 0, 1, 2, 3 and 7. According to one embodiment of the invention, each of the devices seeking an identification number may have a different range for the random number for the timer to assist in preventing collisions and also to assist a given device to obtain a higher priority number. In this example for illustrative purposes, device A always has the fastest timer while device C always has the slowest timer. However, the devices may have overlapping ranges of timers.

In a first cycle, device A has the fastest timer and would be the first device to check to see if identification number 0 is available unless device 0 on the bus was already targeted on the bus by other devices. Device A would change its identification number to 1 and would determine through the above described processes that identification number 0 is not available on the bus. Device A would then generate a "test unit ready" command and then return to step 410 of FIG. 3. In addition, devices B and C would see that device 0 was targeted on the bus by device A and they would also reset their timers and return to step 410 of FIG. 3. As a result, even if several devices are seeking an identification number at the same time and they start with the same identification number, they would step through the possible identification numbers together even if their timers were set to different time lengths. This process would continue through cycles 2–7 as illustrated until each of the devices would obtain an identification number not already utilized by another device. Of course, as described with reference to FIG. 3, two passes for each successful selection of an identification number will be performed according to a preferred embodiment of the invention. It is noted that device C, with the consistently slower timer, received the highest priority identification number.

Although the present invention has been fully described above with reference to specific embodiments, other alternative embodiments will be apparent to those of ordinary skill in the art. For example, a range or list of possible identification numbers may be specified for the device to check in order to group similar devices. In addition, is high availability environments, a device may notify all other devices of its presence and its new identification number. Furthermore, the devices may swap or change identification numbers, and hence their priorities, after obtaining their identification number. Therefore, the above description should not be taken as limiting the scope of the present invention which is defined by the appended claims.

What is claimed is:

1. In a computer system having a plurality of devices on a bus, a method for a first device on the bus to designate its own identifier on the bus comprising the steps of:

first determining that no device on the bus with a desired identifier is requested by any other device on the bus over a predetermined period of time;

upon such first determination, said first device transmitting on the bus a request for a device with the desired identifier to respond;

secondly determining that no device on the bus responds to the request; and upon such second determination, the first device designating the desired identifier to identify the first device on the bus to at least one of the plurality of devices on the bus other than the first device.

2. The method of claim 1 wherein the step of secondly determining includes waiting a predetermined amount of time for any device to respond to the request.

3. The method of claim 2 wherein the step of requesting includes utilizing a second identifier to identify the first device on the bus during the transmitted request.

4. The method of claim 1 wherein the desired identifier is initially the same for all devices seeking an identifier on the bus.

5. The method of claim 4 further comprising a step of notifying at least one other device of the designated identifier of the first device.

6. In a computer system having a plurality of devices on a bus, a first device comprising:

means for first determining that no device on the bus with a desired identifier is requested by any other device on the bus over a predetermined period of time;

means for, upon such first determination, transmitting on the bus a request for a device with the desired identifier to respond;

means for secondly determining that no device on the bus responds to the request; and means for, upon such second determination, the first device designating the desired identifier to identify the first device on the bus to at least one of the plurality of devices on the bus other than the first device.

7. The first device of claim 6 wherein the means for secondly determining includes means for waiting a predetermined amount of time for any device to respond to the request.

8. The first device of claim 7 wherein the means for requesting includes means for utilizing a second identifier to identify the first device on the bus during the transmitted request.

9. The first device of claim 6 wherein the desired identifier is initially the same for all devices seeking an identifier on the bus.

10. The first device of claim 9 further comprising means for notifying at least one other device of the designated identifier of the first device.

11. The first device of claim 10 wherein the desired identifier is initially the same for all devices seeking an identifier on the bus.

12. The first device of claim 11 further comprising means for notifying at least one other device of the designated identifier of the first device.

13. The computer system of claim 6 wherein the predetermined period of time is randomly generated by the first device.

14. A data processing system comprising:

a plurality of devices on a bus, said plurality of devices including a first device, said first device including:

means for first determining that no device on the bus with a desired identifier is requested by any other device on the bus over a predetermined period of time;

means for, upon such first determination, transmitting on the bus a request for a device with the desired identifier to respond;

means for secondly determining that no device on the bus responds to the request; and means for upon such second determination, the first device designating the desired identifier to identify the first device on the bus to at least one of the plurality of devices on the bus other than the first device.

15. The first device of claim 14 wherein the means for second determining includes means for waiting a predetermined amount of time for any device to respond to the request.

16. The first device of claim 15 wherein the means for requesting includes means for utilizing a second identifier to identify the first device on the bus during the transmitted request.

17. The data processing system of claim 14 wherein the predetermined period of time is randomly generated by the first device.

18. The method of claim 1 wherein the predetermined period of time is randomly generated by the first device.

\* \* \* \* \*